Sept. 22, 1959 J. P. ECKERT, JR., ET AL 2,905,767

PROTECTIVE APPARATUS FOR MAGNETIC RECORDING AND SENSING HEAD

Filed Dec. 18, 1952 2 Sheets-Sheet 1

INVENTORS
JOHN PRESPER ECKERT, JR.
ALBERT BLAIN

George O. Eltgroth

ATTORNEY

INVENTORS
JOHN PRESPER ECKERT, JR.
ALBERT BLAIN
George V. Eltgroth
ATTORNEY

United States Patent Office 2,905,767

Patented Sept. 22, 1959

2,905,767

PROTECTIVE APPARATUS FOR MAGNETIC RECORDING AND SENSING HEAD

John Presper Eckert, Jr., Gladwyne, and Albert Blain, Philadelphia, Pa., assignors to Sperry Rand Corporation, a corporation of Delaware Application December 18, 1952, Serial No. 326,730

15 Claims. (Cl. 179—100.2)

This invention relates to apparatus for the prevention of wear due to abrasions of two surfaces in rubbing contact, and more particularly to the prevention of wear in magnetic recording and sensing heads due to the abrasion by the magnetic tape used therewith.

In magnetic recording and sensing equipment it is customary to use tapes upon which records of sound or other information can be magnetically impressed. These tapes are generally either made of a solid magnetic material or of a non-magnetic material coated with a magnetic surface. Materials which are suitable for the reception of magnetic records must be magnetically hard; that is they must resist demagnetization and, for magnetic recording purposes, must preferably also hold a large residual magnetism. It is well-known that such magnetically hard materials are also mechanically hard. In consequence, it has been observed that in magnetic recording and sensing equipment, where such hard tapes or tapes coated with such hard material are continually passed across a magnetic head, an abrasion of the head results. A magnetic head has tiny gaps which, in association with the signal coils and magnetic cores, are used to magnetize the tape or to sense the presence of magnetism in it and which lose the dimensions desired for optimum operation, if their pole tips are constantly abraded. Moreover, such abrasions shorten the life of the magnetic tape, and many non-magnetic tapes with coatings of magnetic materials tend to lose their coatings for the same reason. A magnetic dust is produced which consists of tiny particles of the coating material, and this dust penetrates the magnetic heads and other parts of the recording and reproducing mechanism so as to interfere with its proper operation and to lower the signal to noise ratio.

To overcome these difficulties in the operation of the magnetic recording and sensing apparatus, the invention provides a spacer of non-magnetic material which is interposed between the magnetic head and the magnetic tape so as to eliminate any direct contact between head and tape.

Accordingly, it is one object of this invention to eliminate excessive wear between surfaces of magnetic materials normally operated in contact with each other.

Another object is to eliminate the production of abrasion particles which may penetrate into the magnetic head.

A further object is to interpose a comparatively flexible material between the relatively rigid magnetic tape and the magnetic head.

Still another object is to improve the signal to noise ratio.

Additional objects of this invention will be apparent from the following description in conjunction with the accompanying drawings in which.

The spacer which is interposed between the magnetic head and the magnetic tape consists, preferably, of a rather thin sheet of non-magnetic material whose coefficient of friction is comparatively low. This may be, for example, thin ribbons of paper, oiled or impregnated with wax, or thin sheets of polished non-abrasive metal or thin sheets of plastic with a metal coating either on both side or, at least, on the one side which faces the tape. The use of colloidal graphite or similar substances as a lubricant has been found to be highly effective as an additional means of lowering the coefficient of friction. Such a coating with colloidal graphite may also tend to reduce the amount of static charges accumulating on the spacer which, if excessive, might interfere with the proper operation of the apparatus.

The presence of the spacer between the magnetic tape and the magnetic head is such that the abrasive character of the tape causes partial destruction of the spacer during the operation. The deterioration of the expendable spacer is expected, however, whereas deterioration either of the magnetic tape or of the magnetic head is not desired.

It is another essential feature of the invention that the motion of the spacer is very much slower than the motion of the magnetic tape. The slowest possible motion of the spacer is determined by the rate of abrasion which the spacer is subjected to on account of the motion of the tape. The tape may move over the magnetic head, for example, with a speed of about ten feet per second. Experience has shown that a convenient speed for some spacer material may average about six inches per hour or less. This would mean, in the given example, that the spacer is traveling at a rate of about one seventy-thousandth or less of the speed of the magnetic tape.

Figure 1:
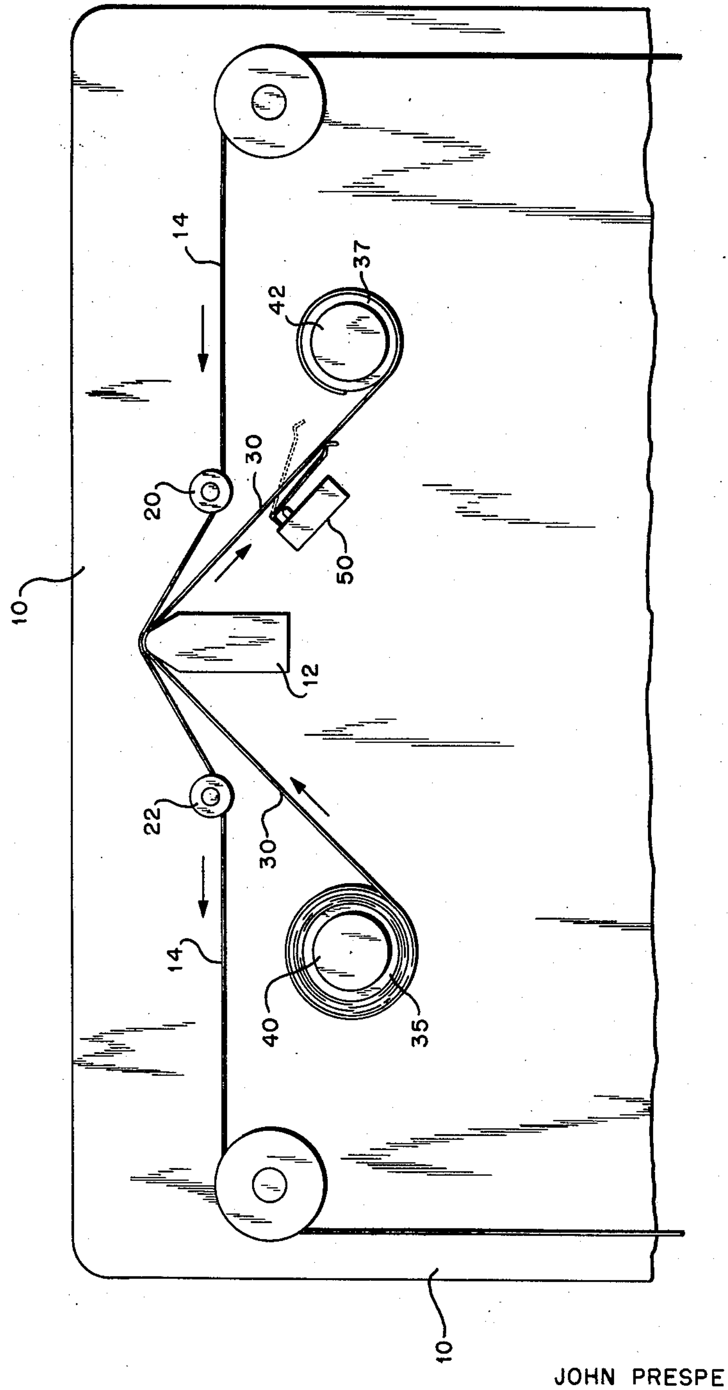
Figure 1 is a front view of a panel utilizing an embodiment of the invention.

It should be noted that the spacer moves in one direction only, as indicated by arrows in Figure 1, while the tape may move in both directions. The primary motion of the tape is naturally in the direction from its supply reel to its take-up reel which is also indicated by arrows in Figure 1. Afterwards its motion may be in the opposite direction, as for the purpose of rereeling or of erasing. The spacer moves, in accordance with the invention, in contrary motion to the primary motion of the tape so that it wipes any dust or dirt off the tape before the tape has passed over the magnetic head. Such dust or dirt will embed itself in the relatively softer material of the spacer which carries it away from the head and keeps it from accumulating in or around the magnetic transducer where it might interfere with its operations.

The interposition of the spacer between the magnetic tape and the magnetic head serves also another purpose. The magnetic tape consists of hard material, as explained above, and is, therefore, by its very nature comparatively rigid and inflexible. Due to this unyieldingness, it cannot cling to the magnetic head as closely as may be desirable to insure a contact with the head which is even and uniform across its width. The comparative inequality in contact strength of points aligned across the width of the tape may lead, in turn, to a distortion of the produced or reproduced signals. The danger of this kind of distortion is greatly minimized by the use of the spacer. The spacer itself, being of much more flexible material than the tape, does not show the unyieldingness of the latter and hugs, therefore, the magnetic head as closely as desired. It increases, at the same time, the distance between the tape and the head. This slight increase in distance is very valuable because it decreases the differences in signal responses due to stronger and weaker contacts between the tape and the spacer and, therefore, indirectly between the tape and the head, to a point where such differences become negligible.

The apparatus illustrated in Figure 1 has a magnetic sensing and/or recording head 12 mounted on a panel 10 and a magnetic tape 14 passing over said magnetic head. The tape may be moved by any suitable driving mechanism the details of which are not shown. Guide pulleys 20 and 22 control the position of the magnetic tape at its points of entry into and departure from the magnetic head. Two hubs 40 and 42 are mounted adjacent to each side of the magnetic head, hub 40 for the purpose of carrying the supply spool 35 for the spacer 30 while hub 42 serves to hold the take-up spool 37 for the spacer. A small clock motor seated on the back of panel 10 may be directly coupled to the shaft of hub 42 and thus be used to pull the spacer from the supply spool over the magnetic head to the take-up spool.

Figure 2:
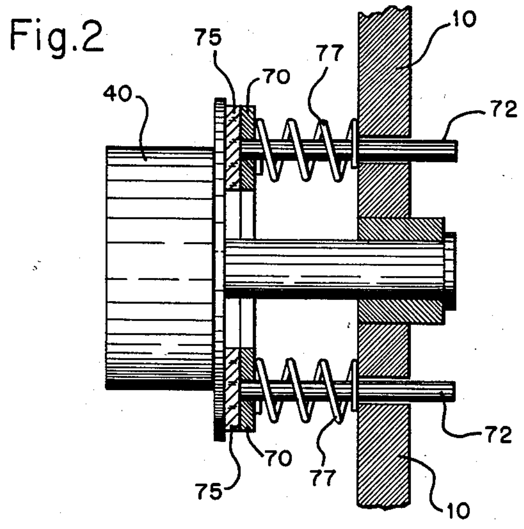
Figure 2 shows a disc brake applied to a supply reel.

In order to prevent the spacer from slackening, the invention provides a disc brake for hub 40, as exemplified by Figure 2. A pressure plate 70, held in place by pins 72, is urged by springs 77 against a disc 75 of elastic material as, for example, cork which, in turn, presses against hub 40. Said springs 77 are positioned around said pins 72 and confined between the outer surface of panel 10 and the inner surface of pressure plate 70. The brake effect thus obtained in regard to hub 40 is conveyed to the supply spool 35 by any suitable means of synchronization as, for example, a tooth on the inner periphery of spool 35 which protrudes into a corresponding indentation on the outer periphery of hub 40.

The invention provides also an interlock which prevents the magnetic tape from abrading the magnetic head if and when the spacer should break. A switch 50 (Figure 1) is held in its closed position due to pressure exerted by the spacer 30 and automatically opens a suitable circuit whenever said pressure is released. The circuit, in turn, stops the motor drive which moves the magnetic tape over the magnetic head. The open position of the switch is indicated by dotted lines in Figure 1. This device not only eliminates unnecessary abrasion in case of such an emergency, it also safeguards the proper functioning of the recording and sensing apparatus, since the electromagnetic and electronic effects may be altered, if the tape should pass in direct contact with the magnetic head, instead of being spaced from it by the thickness of the spacer.

Figure 3:
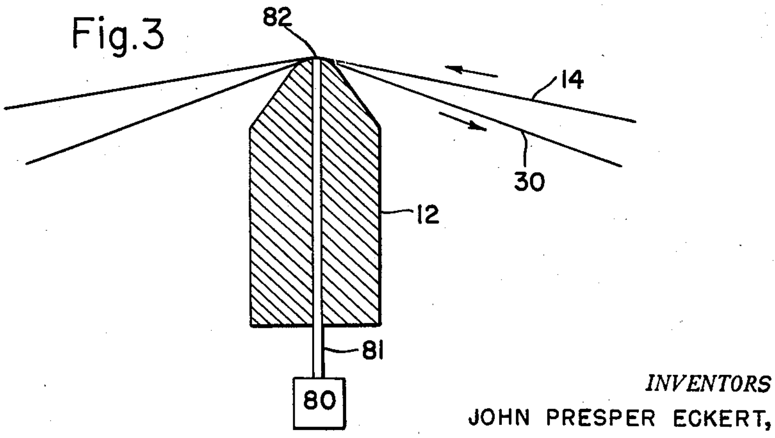
Figure 3 is an enlarged front view, partly in section, of another embodiment of the invention featuring a pneumatic cleaning arrangement.

The arrangement shown in Figure 1 may be augmented by having a slot shaped orifice disposed beneath the magnetic tape and the spacer at their points of engagement, as is shown in Figure 3. A hose or pipe 81 may connect said orifice 82 to a source of low atmospheric pressure 80, such as a vacuum pump or blower, which creates suction in the orifice to remove any dust or particles which may be produced as a result of the abrasive contact between the tape 14 and the spacer 30. The vacuum nozzle is not needed if the spacer consists of non-abrasive metal or of a plastic with a metal coating and not of paper or other soft materials.

While this invention has been described and illustrated with reference to a specific embodiment, it is to be understood that the invention is capable of various modifications and applications, not departing essentially from the spirit thereof, which will become apparent to those skilled in the art. For example, both the drive and the brake mechanisms for the spacer or its spools may be arranged in different ways without interfering with the spirit of the invention.

What is claimed is:

1. In combination, a magnetic transducer, a magnetic tape movable relative to said magnetic transducer, a spacer of low coefficient of friction material interposed between and in contact with said magnetic tape and said magnetic transducer, and driving means for moving said spacer relative to both said magnetic tape and said magnetic transducer, said driving means being operative to move said spacer over said magnetic transducer at a speed which is different from the speed of said magnetic tape.

2. In combination, a magnetic transducer, a magnetic tape movable relative to said magnetic transducer, an expendable protective spacer interposed between and in contact with said magnetic tape and said magnetic transducer, and driving means for moving said spacer relative to both said magnetic tape and said magnetic transducer, said driving means being operative to move said spacer over said magnetic transducer at a speed which is different from the speed of said magnetic tape and represents the slowest possible speed permitted by the rate of abrasion to which said spacer is subjected on account of the motion of said magnetic tape.

3. The combination according to claim 1 in which said spacer is lubricant bearing.

4. The combination according to claim 1 in which said magnetic tape may move in either direction while said spacer moves exclusively in one direction.

5. The combination according to claim 1 in which said magnetic tape consists of paramagnetic material.

6. The combination according to claim 1 in which said magnetic tape consists of diamagnetic material coated with film of paramagnetic material.

7. The combination according to claim 1 in which a pneumatic mechanism passes a stream of air across said spacer and said magnetic tape at their point of engagement to remove dust or other particles.

8. In combination, a stationary member, a hard strip member operatively associated with said stationary member and movable relative to said stationary member at a first speed, a mutually protective spacer strip fabricated of a soft material interposed between and in contact with both said strip member and said stationary member, and driving means for moving said spacer strip relative to both said strip member and said stationary member, said driving means being operative to drive said spacer across said stationary member at a speed which is different from the speed of said strip member.

9. The combination according to claim 8 in which a second driving mechanism is included for moving said strip member relative to said stationary member, switch means for conditioning said second driving mechanism for operation when in its closed position, said switch means being located adjacent to the traveling path of said spacer and being closed and kept closed through the pressure of said spacer.

10. In combination, a stationary member over which a hard strip member is adapted to be drawn, means for drawing said hard strip member over said stationary member, primarily in one direction and at a relatively fast rate, a protective spacer member overlying said stationary member and adapted to prevent contact of said stationary member by the strip member said spacer being fabricated of a soft material to prevent wearing of said stationary member and said rigid strip member, and means for moving said spacer member over said stationary member at a relatively slow rate and in a direction opposite said one direction.

11. The combination according to claim 1 in which a second driving mechanism is included for moving said magnetic tape relative to said magnetic transducer, switch means for conditioning said second driving mechanism for operation when in its closed position, said switch means being located adjacent to the traveling path of said spacer and being closed and kept closed through the pressure of said spacer.

12. In a magnetic recording apparatus, the combination of a magnetic transducer, a magnetic recording surface, means for moving said magnetic recording surface relative to said magnetic transducer, a protective spacer having a low coefficient of friction interposed between and in contact with said magnetic recording surface and said magnetic transducer, and driving means for moving said protective spacer relative to both said magnetic recording surface and said magnetic transducer, said driving means being operative to move said protective spacer at a speed which is different from the speed of said magnetic recording surface.

13. In a magnetic recording apparatus, the combination of a magnetic transducer, a magnetic recording surface, means for moving said magnetic surface relative to said magnetic transducer at a certain speed, a protective spacer having a low coefficient of friction interposed between and in contact with said magnetic surface and said magnetic transducer, and means for moving said protective spacer relative to both said magnetic surface and said magnetic transducer at a speed lower than the speed of said magnetic surface.

14. In a recording apparatus, the combination of a transducer, a recording surface, means for moving said recording surface adjacent and relative to said transducer at a certain speed, a protective spacer having a low coefficient of friction interposed between and in contact with said recording surface and said transducer, and driving means for moving said protective spacer relative to both said recording surface and said transducer, said driving means being operative to move said protective spacer at a speed which is lower than the speed of said recording surface.

15. In a magnetic recording apparatus utilizing a movable magnetic surface for recording information signals thereon, the combination of a magnetic transducer, means for moving said magnetic surface at a certain speed adjacent said transducer, and means for supplying a protective spacer having a low coefficient of friction and for moving said protective spacer between and in contact with said movable magnetic surface and said magnetic transducer at a speed lower than said certain speed of said movable magnetic surface.

References Cited in the file of this patent

UNITED STATES PATENTS

| | | |
|---|---|---|
| 1,011,508 | Smith | Dec. 12, 1911 |
| 2,040,693 | Huguenard | May 12, 1936 |
| 2,191,691 | Woolf | Feb. 27, 1940 |
| 2,315,108 | Chism | Mar. 30, 1943 |
| 2,479,506 | Payton | Aug. 16, 1949 |
| 2,484,568 | Howell | Oct. 11, 1949 |
| 2,513,423 | Owens | July 4, 1950 |
| 2,519,725 | White | Aug. 22, 1950 |
| 2,585,932 | Hare | Feb. 19, 1952 |
| 2,607,710 | Schmelzle | Aug. 19, 1952 |
| 2,612,566 | Anderson | Sept. 30, 1952 |
| 2,715,360 | Brown | Aug. 16, 1955 |

OTHER REFERENCES

Electronics Article, "Magnetic Recording Rubber," vol. 24, issue 12, pages 276, 278, December 1951.